(12) United States Patent
Ranganathan et al.

(10) Patent No.: US 9,741,467 B2
(45) Date of Patent: Aug. 22, 2017

(54) FLUORO COPOLYMER COATINGS FOR OVERHEAD CONDUCTORS

(71) Applicant: GENERAL CABLE TECHNOLOGIES CORPORATION, Highland Heights, KY (US)

(72) Inventors: Sathish Kumar Ranganathan, Indianapolis, IN (US); Vijay Mhetar, Carmel, IN (US); Srinivas Siripurapu, Carmel, IN (US)

(73) Assignee: General Cable Technologies Corporation, Highland Heights, KY (US)

( * ) Notice: Subject to any disclaimer, the term of this patent is extended or adjusted under 35 U.S.C. 154(b) by 0 days.

(21) Appl. No.: 14/819,069

(22) Filed: Aug. 5, 2015

(65) Prior Publication Data

US 2016/0042837 A1    Feb. 11, 2016

Related U.S. Application Data

(60) Provisional application No. 62/033,432, filed on Aug. 5, 2014.

(51) Int. Cl.
*H01B 7/00*    (2006.01)
*H01B 7/42*    (2006.01)
(Continued)

(52) U.S. Cl.
CPC .............. *H01B 7/42* (2013.01); *C09D 127/18* (2013.01); *C09D 127/22* (2013.01); *H01B 3/30* (2013.01);
(Continued)

(58) Field of Classification Search
CPC ........ H01R 4/02; H01R 4/0421; H01R 4/029; H01R 9/03
(Continued)

(56) References Cited

U.S. PATENT DOCUMENTS 4,383,133 A    5/1983   Lanfranconi
4,513,173 A    4/1985   Merry
(Continued)

FOREIGN PATENT DOCUMENTS

CA    102977700 A  *  3/2013  ............... H01B 7/17
CN    101125979 A     2/2008
(Continued)

OTHER PUBLICATIONS

Copenheaver, Blaine; International Search Report and Written Opinion of the International Searching Authority, issued in International Application No. PCT/US2015/043814; dated as mailed on Oct. 28, 2015; 10 pages.
(Continued)

*Primary Examiner* — William H Mayo, III
(74) *Attorney, Agent, or Firm* — Ulmer & Berne LLP

(57) ABSTRACT

A coating composition includes a fluoroethylene vinyl ether copolymer, a cross-linking agent, and water. The coating composition reduces the operating temperature of an overhead conductor by at least about 5° C. or more compared to a similar uncoated overhead conductor when the operating temperatures of each overhead conductor are measured at about 100° C. or higher and the coating composition is substantially free of solvent. Methods for making a coating composition and for making a coated overhead conductor are disclosed.

20 Claims, 5 Drawing Sheets

(51) Int. Cl.
  *C09D 127/22* (2006.01)
  *H01B 3/30* (2006.01)
  *H01B 7/02* (2006.01)
  *H01B 13/06* (2006.01)
  *H02G 7/00* (2006.01)
  *C09D 127/18* (2006.01)

(52) U.S. Cl.
  CPC .............. *H01B 7/02* (2013.01); *H01B 13/06* (2013.01); *H02G 7/00* (2013.01)

(58) Field of Classification Search
  USPC ............. 174/102 R, 84 R, 84 C, 88 R, 88 C; 439/578, 582–585
  See application file for complete search history.

(56) References Cited

U.S. PATENT DOCUMENTS

| | | | |
|---|---|---|---|
| 4,801,501 A | 1/1989 | Harlow | |
| 4,988,835 A | 1/1991 | Shah | |
| 5,217,391 A * | 6/1993 | Fisher, Jr. | H01R 24/44 439/578 |
| 5,269,701 A * | 12/1993 | Leibfried, Jr. | H01R 9/0518 29/828 |
| 5,518,420 A * | 5/1996 | Pitschi | H01R 24/564 439/578 |
| 5,725,953 A | 3/1998 | Onishi et al. | |
| 6,018,000 A | 1/2000 | Keeny et al. | |
| 6,027,373 A * | 2/2000 | Gray | H01R 4/489 174/74 R |
| 6,159,046 A * | 12/2000 | Wong | H01R 43/22 439/578 |
| 6,369,328 B1 | 4/2002 | Munakata | |
| 7,015,395 B2 | 3/2006 | Goldsworthy et al. | |
| 7,381,089 B2 * | 6/2008 | Hosler, Sr. | H01R 9/0524 439/578 |
| 7,384,307 B1 * | 6/2008 | Wang | H01R 9/0524 439/394 |
| 7,438,971 B2 | 10/2008 | Bryant et al. | |
| 7,488,209 B2 * | 2/2009 | Vaccaro | H01R 9/0521 439/578 |
| 7,527,512 B2 * | 5/2009 | Montena | H01R 24/564 29/861 |
| 7,637,774 B1 * | 12/2009 | Vaccaro | H01R 9/0521 29/828 |
| 7,683,262 B2 | 3/2010 | Guery et al. | |
| 7,752,754 B2 | 7/2010 | Goldsworthy et al. | |
| 7,934,954 B1 * | 5/2011 | Chawgo | H01R 9/0524 439/578 |
| 7,935,890 B2 | 5/2011 | Holzmueller et al. | |
| 7,939,764 B2 | 5/2011 | Gottfried et al. | |
| 8,165,439 B2 | 4/2012 | Overton | |
| 8,211,220 B2 | 7/2012 | Kim | |
| 8,371,028 B2 | 2/2013 | Goldsworthy et al. | |
| 8,535,033 B2 | 9/2013 | Castiglioni et al. | |
| 8,857,733 B1 | 10/2014 | Galbraith et al. | |
| 9,011,791 B2 | 4/2015 | Olver et al. | |
| 2003/0047718 A1 * | 3/2003 | Narayan | C08K 9/02 252/500 |
| 2004/0016503 A1 | 1/2004 | Stowe | |
| 2004/0069524 A1 | 4/2004 | Beauchamp | |
| 2005/0045368 A1 | 3/2005 | Keogh | |
| 2005/0239983 A1 | 10/2005 | Wille et al. | |
| 2006/0264563 A1 | 11/2006 | Hanrahan et al. | |
| 2007/0023735 A1 | 2/2007 | Biscoglio et al. | |
| 2007/0193767 A1 | 8/2007 | Guery et al. | |
| 2008/0015298 A1 * | 1/2008 | Xiong | C08K 3/22 524/432 |
| 2009/0155570 A1 | 6/2009 | Bonnet et al. | |
| 2010/0076719 A1 | 3/2010 | Lawry et al. | |
| 2010/0202741 A1 | 8/2010 | Ryan et al. | |
| 2010/0304270 A1 | 12/2010 | Amin-Sanayei et al. | |
| 2011/0118403 A1 | 5/2011 | Wood et al. | |
| 2011/0239451 A1 * | 10/2011 | Montena | H01R 24/56 29/747 |
| 2011/0239455 A1 * | 10/2011 | Montena | H01R 9/0524 29/828 |
| 2012/0018190 A1 | 1/2012 | Smedberg et al. | |
| 2012/0106591 A1 | 5/2012 | Springer, III | |
| 2012/0129974 A1 | 5/2012 | DeNotta et al. | |
| 2012/0186851 A1 | 7/2012 | Winterhalter et al. | |
| 2012/0261158 A1 | 10/2012 | Daniel et al. | |
| 2013/0167502 A1 | 7/2013 | Wilson et al. | |
| 2013/0186670 A1 | 7/2013 | Person | |
| 2014/0041925 A1 * | 2/2014 | Davis | H01B 7/29 174/40 R |
| 2014/0205804 A1 * | 7/2014 | Jones | B65D 83/752 428/141 |
| 2015/0049992 A1 | 2/2015 | Bauco | |
| 2015/0194240 A1 | 7/2015 | Ranganathan et al. | |
| 2017/0137659 A1 | 5/2017 | Ranganathan et al. | |

FOREIGN PATENT DOCUMENTS

| | | | |
|---|---|---|---|
| CN | 102146249 A | 8/2011 | |
| CN | 102446578 A | 5/2012 | |
| CN | 102977700 A | 3/2013 | |
| CN | 103131274 A | 6/2013 | |
| CN | 203038717 U | 7/2013 | |
| DE | 3824608 C1 | 8/1989 | |
| EP | 2 219 267 A1 * | 2/2009 | .............. H01R 4/02 |
| FR | 2971617 A1 | 8/2012 | |
| JP | 2000-30543 A | 1/2000 | |
| JP | 2005177572 A | 7/2005 | |
| JP | 2006104395 A | 4/2006 | |
| JP | 4252875 B2 | 4/2009 | |
| WO | 2007034248 A1 | 3/2007 | |
| WO | WO 2007/034248 A * | 3/2007 | .............. H01B 5/00 |
| WO | 2010042191 A1 | 4/2010 | |

OTHER PUBLICATIONS

Modern Practical Handbook for Electric Engineers, vol. 1; published Feb. 29, 2012, by China Water & Power Press; 23 pages.

* cited by examiner

FLUORO COPOLYMER COATINGS FOR OVERHEAD CONDUCTORS

REFERENCE TO RELATED APPLICATIONS

The present application claims the priority of U.S. provisional application Ser. No. 62/033,432, entitled FLUORO COPOLYMER COATINGS FOR OVERHEAD CONDUCTORS, filed Aug. 5, 2014, and hereby incorporates the same application herein by reference in its entirety.

TECHNICAL FIELD

The present disclosure generally relates to fluoro copolymer coatings useful in the coating of overhead conductors.

BACKGROUND

As the demand for electricity grows, there is an increased need for higher capacity electricity transmission and distribution lines. The amount of power a transmission line can deliver is dependent on the current-carrying capacity (ampacity) of the line. Such ampacity is limited, however, by the maximum safe operating temperature of the bare conductor that carries the current. Exceeding this temperature can result in damage to the conductor or other components of the transmission line. However, the electrical resistance of the conductor increases as the conductor rises in temperature or power load. A transmission line with a coating that reduces the operating temperature of a conductor would allow for a transmission line with lowered electrical resistance, increased ampacity, and the capacity to deliver larger quantities of power to consumers. Therefore, there is a need for a polymeric coating layer that has a low absorptivity in order to limit the amount of heat absorbed from solar radiation, a high thermal conductivity and emissivity in order to increase the amount of heat emitted away from the conductor, a high thermal resistance and heat aging resistance to boost life span and survival at high conductor temperatures, and which can be produced in a continuous and solvent-free process.

SUMMARY

In accordance with one embodiment, a coating composition includes a water-dispersible fluoroethylene vinyl ether copolymer, a cross-linking agent, and water. The coating composition is configured to reduce the operating temperature of an overhead conductor by at least about 5° C compared to a similar uncoated overhead conductor when the operating temperatures of each overhead conductor are measured at about 100° C or higher. The coating composition is substantially free of solvent.

In accordance with another embodiment, a method of producing a coating for an overhead conductor includes providing a compositional kit formed from a first and a second composition, mixing the first composition with the second composition to form a coating composition, and applying the coating composition to at least a portion of an overhead conductor to form a coated overhead conductor. The first composition includes a water-dispersible fluoroethylene vinyl ether copolymer and the second composition includes a cross-linking agent. The coating reduces the operating temperature of the coated overhead conductor by about 5° C or more compared to a similar uncoated overhead conductor when the operating temperatures of each overhead conductor are measured at about 100° C or higher. The coating composition is substantially free of solvent.

In accordance with another embodiment, an improved overhead conductor includes a plurality of conductive wires and a coating on the surface of at least some of the plurality of conductive wires. The coating is formed from a coating composition. The coating composition includes a water-dispersible fluoroethylene vinyl ether copolymer, a cross-linking agent, and water. The improved overhead conductor has a reduced operating temperature of about 5° C or more compared to a similar uncoated overhead conductor when the operating temperatures of each overhead conductor are measured at about 100° C or higher.

DETAILED DESCRIPTION

Figure 1:
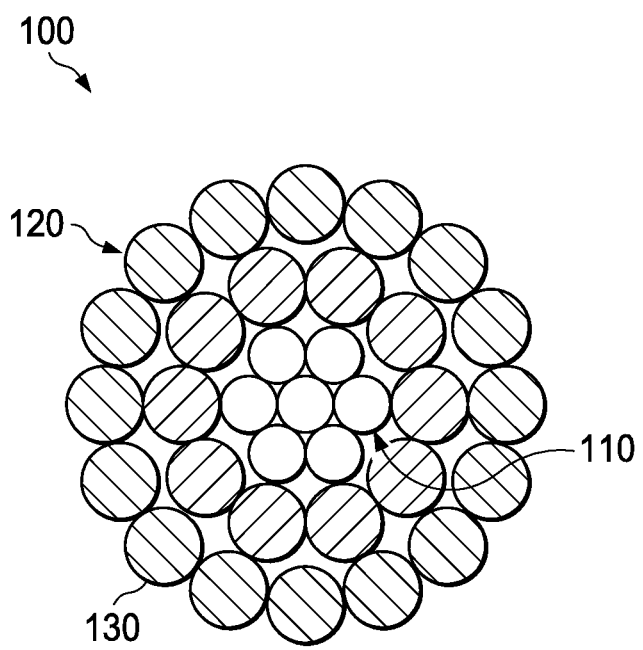
FIG. 1 depicts a cross-sectional view of a conductor in accordance with certain embodiments.

The temperature of a conductor is dependent on a number of influences including the electrical properties of the conductor, the physical properties of the conductor, the operation of the conductor, and local weather conditions. Decreasing the operating temperature of a conductor can allow for a given conductor to conduct a greater amount of power than a similar conductor operating at a higher temperature. One such temperature reduction can occur by limiting heating of the cable due to factors other than through use of the cable and by increasing the rate of cooling. One such factor increasing the temperature of a conductor is the conductor's absorption of solar radiation from the sun. The amount of heat absorbed from the solar radiation is dependent on conductor's surface's coefficient of absorptivity ("absorptivity") with a low absorptivity indicating that the conductor absorbs only a small amount of heat due to solar radiation.

Likewise, a conductor can be cooled through emission of heat through convection, conduction or radiation. The amount of heat radiated through such emissive properties is dependent on the conductor surface's coefficient of emissivity ("emissivity") with a high emissivity indicating that the conductor is radiating more heat than a conductor with a low emissivity.

According to certain embodiments, a conductor (e.g., overhead conductor) can include a coating that has a low surface coefficient of absorptivity and a high surface coefficient of emissivity. Such a conductor can operate at a lower temperature than an identical conductor without such a coating. For example, according to certain embodiments, a conductor having a coating can, when tested in accordance with ANSI C119.4-2004, reduce the operating temperature of a conductor by about 5° C, or more, than a similar conductor without such a coating. In certain embodiments, the operating temperature can be reduced by about 5° C or more when compared to the operating temperature of an uncoated conductor, when the operating temperatures measured are about 60° C or higher. In certain embodiments, the operating temperature can be reduced by about 10° C or more, when compared to the operating temperature of an uncoated conductor, when the operating temperatures measured are about 100° C or higher.

In certain embodiments, a coating can be formed from curing a coating composition including a cross-linkable fluoro copolymer compound having one, or more, reactive groups. Suitable fluoro copolymer compounds can include fluoroolefin vinyl ether copolymer, hexafluoropropylene, perfluoroalkylvinyl ether, halogenated trifluoroethylene, vinylfluoride, perfluoro alkyl vinyl ether, tetrafluoro ethylene, and perfluoro alkoxy polymer.

Fluoroolefin vinyl ether is a copolymer of a fluoroolefin, cyclohexyl vinyl ether, and hydroxylalkyl vinyl ether. Fluoroolefin vinyl ether copolymers can have the general structure:

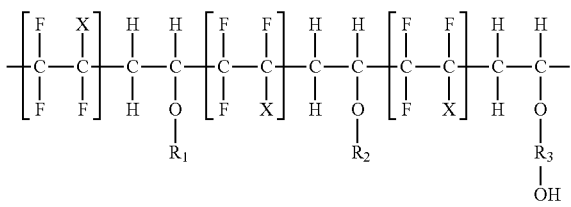

wherein X is Cl or F, $R_1$ and $R_2$ are independently $C_{2-8}$ alkyl or $C_6$ cycloalkyl; and $R_3$ is $C_{2-8}$ alkylene or $C_6$ cycloalkylene. The copolymer can also include repeating units of the formula:

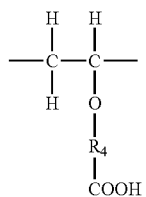

wherein $R_4$ is $C_{2-8}$ alkylene or $C_6$ cycloalkylene.

Fluoroolefin vinyl ether copolymers can be amorphous, alternating thermosetting polymers that include a fluoroolefin and a vinyl monomer. Suitable fluorolefins can include tetrafluoroethylene and chlorotrifluoroethylene and suitable vinyl monomers can include alkylvinyl ethers, for example ethyl, butyl or cyclohexyl vinyl ethers, and hydroxyvinyl ethers such as 2-hydroxyethyl vinyl ether. Specific fluoroolefin vinyl ether copolymer compounds that can be included in the coating composition can include fluoroethylene vinyl ether copolymer compounds ("FEVE").

In certain embodiments, fluoro copoylmer compounds can be water dispersible and can contain one or more reactive reactive groups to impart certain functionality to the fluoro copolymer. For example, certain reactive groups can impart, or promote, one or more of transparency, glossiness, hardness, flexibility, adhesiveness, pigment compatibility, or cross-linkability. Additionally, such reactive groups can improve the processability and weatherability of the fluoro copolymer based coating. Such reactive groups can be pendant or terminal groups. Specific examples of suitable reactive groups include, without limitation, hydroxyl, acid, epoxy, silane, silanol, amide, and vinyl reactive groups.

The number average molecular weight ($M_n$) of suitable fluoropolymers can vary. For example, suitable FEVE copolymers can have an $M_n$ from about 5,000 g/mol to about 120,000 g/mol in certain embodiments; from about 10,000 g/mol to about 90,000 g/mol in certain embodiments; from about 15,000 g/mol to about 70,000 g/mol in certain embodiments; and from about 25,000 g/mol to about 50,000 g/mol in certain embodiments. In certain embodiments, the $M_n$ can be about 50,000 g/mol or less; and in certain embodiments, the $M_n$ can be about 25,000 g/mol or less.

In certain embodiments having hydroxyl reactive groups, the fluoro copolymer can include at least 10 mg of KOH per gram of the fluoro copolymer. In certain embodiments, the fluoro copolymer can include about 50 mg to about 100 mg KOH per gram of the fluoro copolymer; in certain embodiments about 75 mg KOH per gram of fluoro copolymer or more; and in certain embodiments about 85 mg KOH per gram of fluoro copolymer or more. Hydroxyl groups can increase the water dispersibility of the fluoro copolymer and can act as a cross-linking site for the cross-linking agent or method.

In certain embodiments, a coating composition can include about 50% to about 99%, by dry weight, of a suitable fluoro copoylmer compound; and in certain embodiments from about 75% to about 95%, by dry weight, of a suitable fluoro copolymer compound.

A coating composition can be cross-linked through any suitable method including, for example, moisture, chemical, heat, UV, and e-beam curing methods. Cross-linking agents can include, but are not limited to, cross-linking agents that are reactive to hydroxyls, acids, epoxides, amines, cyanate containing monomers, or oligomers or polymers which have urethane, fluorine, silane, fluoro silane, fluoro silicones, silsesquioxanes, polytetrafluoroethylene ("PTFE"), epoxy, phenolic, ether, silicone, or acrylic groups in back bones or grafted, either alone or in combination with other functional groups, in liquid, semi-solid, or powdered forms. Suitable chemical cross-linking agents (e.g., reactive agents) can include a monomeric or oligomeric polymeric resin that, when mixed with a cross-linkable fluoro copolymer, can promote curing of the composition. Specific examples of suitable cross-linking agents can include acrylates, fluoro silanes, fluoro silicones, methacrylic esters, silanes (including methoxy silanes and epoxy silanes) metal catalysts, triallyl isocyanurate ("TAIC"), peroxides, or combinations thereof. In certain illustrative embodiments, the fluoro copolymer can have, for example, hydroxyl groups that can be cross-linked with a polyisocyanate cross-linking agent such as hexamethylene-6,6-diisocyanate ("HDI"). Such HDI agents can be either aromatic or aliphatic based. In certain embodiments, a catalyst can additionally be included to accelerate the cross-linking reaction. Suitable cross-linking agents can be included, by dry weight, at about 1% to about 20% of the coating composition.

In certain embodiments, a coating composition can include additional components such as, for example, one or more fillers, solvents, defoamers, emulsifiers, thickeners, UV and light stabilizers, or resins.

Suitable fillers for inclusion in a coating composition can include metal oxides, metal nitrides, metal fluorides, rare earth elements, and metal carbides such as, but not limited to, gallium oxide, cerium oxide, zirconium oxide, silicon hexaboride, carbon tetraboride, silicon tetraboride, silicon carbide, molybdenum disilicide, tungsten disilicide, zirconium diboride, zinc oxide, cupric chromite, magnesium oxide, silicon dioxide ("silica"), chromium oxides, iron oxide, boron carbide, boron silicide, copper chromium oxide, titanium dioxide, aluminum nitride, boron nitride, alumina, and combinations thereof. Certain fillers, including for example, boron oxide, zinc oxide, cerium oxide, silicon dioxide, and titanium dioxide can act as an emissivity agent to improve the radiation of heat from the coating.

In certain embodiments, suitable rare earth materials can include one, or more, of a rare earth oxide, a rare earth carbide, a rare earth nitride, a rare earth fluoride, or a rare earth boride. Examples of rare earth oxides include scandium oxide, yttrium oxide, lanthanum oxide, cerium oxide, praseodymium oxide, neodymium oxide, samarium oxide, europium oxide, gadolinium oxide, terbium oxide, dysprosium oxide, holmium oxide, erbium oxide, thulium oxide, ytterbium oxide, and lutetium oxide. Examples of rare earth carbides include scandium carbide, yttrium carbide, cerium carbide, praseodymium carbide, neodymium carbide, samarium carbide, europium carbide, gadolinium carbide, terbium carbide, dysprosium carbide, holmium carbide, erbium carbide, thulium carbide, ytterbium carbide, and lutetium carbide. Examples of rare earth fluorides include scandium fluoride, yttrium fluoride, cerium fluoride, praseodymium fluoride, neodymium fluoride, samarium fluoride, europium fluoride, gadolinium fluoride, terbium fluoride, dysprosium fluoride, holmium fluoride, erbium fluoride, thulium fluoride, ytterbium fluoride, and lutetium fluoride. Examples of rare earth borides include scandium boride, yttrium boride, lanthanum boride, cerium boride, praseodymium boride, neodymium boride, samarium boride, europium boride, gadolinium boride, terbium boride, dysprosium boride, holmium boride, erbium boride, thulium boride, ytterbium boride, and lutetium boride.

In certain embodiments, the filler can also include electrically conductive fillers including carbon nanotubes, graphene, and graphites. Such electrically conductive fillers can, in sufficient quantities, make the coating conductive or semi-conductive. Additionally, such fillers can improve the heat-transfer properties of the coating.

In certain embodiments, the filler can have an average particle size of about 25 microns or less, and in certain embodiments, about 10 microns or less, in certain embodiments, 500 nanometers or less. Suitable fillers can optionally be included in the coating at less than about 50% by weight, in certain embodiments about 2% to about 30% by weight, and in certain embodiments included at about 5% to about 20% by weight.

In certain embodiments, a coating composition can be substantially free of solvents (e.g., organic solvents). Substantially free can mean about 10% or less by weight of solvents in the coating composition; 5% or less by weight of solvents in the coating composition; about 2% or less by weight of solvents in the coating composition; about 1% or less by weight solvents in the coating composition; about 0.5% or less by weight of solvents in the coating composition; or essentially no solvents in the coating composition. In certain embodiments, a coating composition can be formed from water-dispersible fluoro copolymers. In certain embodiments however, solvents can be added to the water base to improve, or modify, certain characteristics of the resulting coating.

A defoamer can be included in certain embodiments to inhibit or retard the formation of foam when water is added to the heat-resistant coating composition. Suitable examples of defoamers can include silicon-based antifoam agents and non-silicon-based antifoam agents. In certain embodiments, a surfactant can also be used as a defoamer. Suitable surfactants include, but are not limited to, cationic, anionic, or non-ionic surfactants, and fatty acid salts. The defoamer can be added at about 0.1% to about 5% by weight of the coating composition.

In certain embodiments, an emulsifier can be included in a coating composition to maintain an even dispersion of compounds in a water solution. As can be appreciated, the need for an emulsifier can depend on the components in the coating composition. For example, a fluoro copolymer with a certain quantity of hydroxyl groups can be water dispersible without the use of an emulsifier. Suitable emulsifiers can include sodium lauryl sulfate, sodium dodecyl phenylsulfonate, potassium stearate, sodium dioctyl sulfosuccinate, dodecyl diphenyloxy disulfonate, ammonium nonyl phenoxyethyl poly(1)ethoxyethyl sulfate, sodium styryl sulfonate, sodium dodecyl allyl sulfosuccinate, linseed oil fatty acid, sodium or ammonium salt of ethoxylated nonylphenol phosphate, sodium octoxynol-3-sulfonate, sodium coconut creatinate, sodium 1-alkoxy-2-hydroxypropyl sulfonate, sodium α-olefin($C_{14}$-$C_{16}$)sulfonate, hydroxyl alkanol sulfate, tetra sodium N-(1,2-dicarboxylethyl)-N-octadecyl sulfosalicyloyl amine salt, N-octadecyl sulfosalicyloyl aminoacid disodium salt, disodium alkylamido polyethoxy sulfosuccinate, disodium ethoxylated nonylphenol sulfosuccinate half ester, sodium ethoxyethyl sulfate. The emulsifier can be included at about 2% to about 3% by weight of the coating composition.

In certain embodiments, coalescent agents or thickeners can be added to improve the formation of a film on a coating. In such embodiments, a coalescent agent can be included at about 20% or less by weight of a coating composition or, in certain embodiments, at about 2% to about 10% by weight of the coating composition.

In certain embodiments, UV or light stabilizers can be added to a coating composition to improve the exterior weather ability. Suitable UV or light stabilizers can include benzotriazole-type, triazine-type UV absorbers, and HALS compounds. The UV or light stabilizer can be included at about 0.1% to about 5%, by weight, of a coating composition.

Additional resins can be included in a coating composition to improve the performance of the coating. For example, one, or more, acrylics, silicones, urethanes, silanes, fluoro silanes, silsesquioxanes, or epoxies can be added to the coating composition. Alternatively, or additionally, commercial lubricants, waxes, and friction reducers can be added to the coating composition. Such resins can improve various properties of the composition including, for example, processability, durability, and service life of the coating. Suitable resins can be included in the coating composition at about 0.1% to about 40% by weight.

A coating for a conductor can have, or impart, a variety of beneficial qualities. For example, in certain embodiments, the coating can have one, or more, of the properties of being transparent, being electrically conductive, having less curing time during coating, having high thermal aging resistance, having reduced dust accumulation, having corrosion resistance, being hydrophobic, having ice accumulation resistance, having weather resistance, having scratch and abrasion resistance, having wear resistance, having flame resistance, having self-healing properties, having reduced surface friction, having better recoatability, and having a reduction in conductor pull forces. Additionally, the heat-radiative coating can impart improvements in conductor lifespan and performance. Hydrophobic properties can mean that a water droplet on a coating can have a contact angle of about 90° or more. In certain embodiments, hydrophobic properties can mean that a water droplet on a coating can have a contact angle of about 130° or more. Self-healing can be activated by exposure to one, or more, conditions including normal atmospheric conditions, UV conditions, thermal conditions, or electric field conditions.

Suitable coatings can be placed on an overhead conductor in certain embodiments. In certain such embodiments, the corona resistance of an overhead conductor coated with such a coating can also be improved through inclusion of conductive or hydrophilic properties of the coating. Self-healing properties can mean that the coating can at least partially restore from physical damages including scratches, rubbing and abrasion, to a non-damaged state.

In certain embodiments, the coating can be formed from a two-part coating composition (also referred to herein as a compositional kit). In such embodiments, the two-part coating composition or compositional kit can include a first composition part having a fluoro copolymer resin, such as a FEVE copolymer, and a second composition part having a cross-linking agent (e.g., reactive agent). The two-parts (e.g., first and second composition parts) can be kept separate until use.

The first and second composition parts can be mixed separately and can be kept separated until just prior to applying the coating composition formed from the compositional kit onto the bare conductor or other substrate. The components of the first part can be mixed and stored dry or wet. When wet, the dispersion medium can be water. The resulting first part, as a wet mixture, can be a suspension with a total solid content of less than 90%, in certain embodiments about 30% to about 70%, and in certain embodiments about 35% to about 60%. The wet second part can similarly be prepared. The second part can be in a liquid or solid state depending on the desired reaction speed and storage requirements. The two-parts of the compositional kit, whether dry or wet, should not come into contact when stored. The compositional kit can begin to cure as soon as the two parts are mixed resulting in a coating composition. As a result of the curing process, the viscosity of the heat-radiative coating composition can increase with time. Because high viscosity adversely affects the coating composition as it is coated onto a bare conductor, the mixing of the first and second parts (compositions) can be delayed as long as necessary.

Upon mixing of the two parts, the coating composition can be used to coat a bare conductor, or other substrate, immediately, or within a certain period of time. In one embodiment, the coating composition can be used within about 24 hours after mixing, in certain embodiments within about 12 hours, and in certain embodiments within about 8 hours. Upon mixing of the two parts into a wet mixture, the viscosity of the wet mixture can be from about 5 seconds to about 30 seconds, in certain embodiments from about 12 seconds to about 25 seconds, and in certain embodiments from about 15 seconds to about 20 seconds as measured by using a B4 Ford cup in accordance to ASTM D1200 (2010). Additionally, the viscosity of the wet mixture can increase no more than about 65% within about 8 hours of mixing the first and second parts together. The coating composition can, according to certain embodiments, have a volume resistivity about $10^9$ ohm·m or less, and in certain embodiments, a volume resistivity about $10^7$ ohm·m or less.

The wet mixture can be produced in a high-speed disperser ("HSD"), ball mill, bead mill or other machine using techniques known in the art. In a one embodiment, a HSD can be used to make the coating composition by slowly added together and mixing the first and second parts together until the desired dispersion of the components is achieved. In certain embodiments, the mixer speed can be about 10 revolutions per minute ("RPM") or more to achieve the desired coating composition.

Once applied and cured on a conductor, the coating can offer a flexible coating that shows no visible cracks when bent on a mandrel of diameter of about 5 inches or less. When the coating shows no visible cracks when bent on mandrel diameters ranging from 0.5 inches to 5 inches and can also be bent on mandrel diameters ranging from 0.5 inches to 5 inches after heat aging at temperatures of at least about 300° C for 7 days, the coating passes the Mandrel Bend Test.

As can be appreciated, overhead conductors can be formed in a variety of configurations including aluminum conductor steel reinforced ("ACSR") cables, aluminum conductor steel supported ("ACSS") cables, aluminum conductor composite core ("ACCC") cables and all aluminum alloy conductor ("AAAC") cables. ACSR cables are high-strength stranded conductors and include outer conductive strands, and supportive center strands. The outer conductive strands can be formed from high-purity aluminum alloys having a high conductivity and low weight. The center supportive strands can be steel and can have the strength required to support the more ductile outer conductive strands. ACSR cables can have an overall high tensile strength. ACSS cables are concentric-lay-stranded cables and include a central core of steel around which is stranded one, or more, layers of aluminum, or aluminum alloy, wires. ACCC cables, in contrast, are reinforced by a central core formed from one, or more, of carbon, glass fiber, or polymer materials. A composite core can offer a variety of advantages over an all-aluminum or steel-reinforced conventional cable as the composite core's combination of high tensile strength and low thermal sag enables longer spans. ACCC cables can enable new lines to be built with fewer supporting structures. AAAC cables are made with aluminum or aluminum alloy wires. AAAC cables can have a better corrosion resistance, due to the fact that they are largely, or completely, aluminum. ACSR, ACSS, ACCC, and AAAC cables can be used as overhead cables for overhead distribution and transmission lines.

FIGS. 1, 2, 3, and 4 illustrate various bare overhead conductors according to certain embodiments. Each overhead conductor depicted in FIGS. 1-4 can include the coating composition. Additionally, FIGS. 1 and 3 can, in certain embodiments, be formed as ACSR cables through selection of steel for the core and aluminum for the conductive wires. Likewise, FIGS. 2 and 4 can, in certain embodiments, be formed as AAAC cables through appropriate selection of aluminum or aluminum alloy for the conductive wires.

As depicted in FIG. 1, certain bare overhead conductors 100 can generally include a core 110 made of one or more wires, a plurality of round cross-sectional conductive wires 120 locating around core 110, and a heat-radiative coating layer 130. The coating layer 130 can be coated on conductive wires 120 or can be coated on only the exposed exterior portion of cable 100. The core 110 can be steel, invar steel, carbon fiber composite, or any other material that can provide strength to the conductor. The conductive wires 120 can be made of any suitable conductive material including copper, a copper alloy, aluminum, an aluminum alloy, including aluminum types 1350, 6000 series alloy aluminum, aluminum-zirconium alloy, or any other conductive metal.

Figure 2:
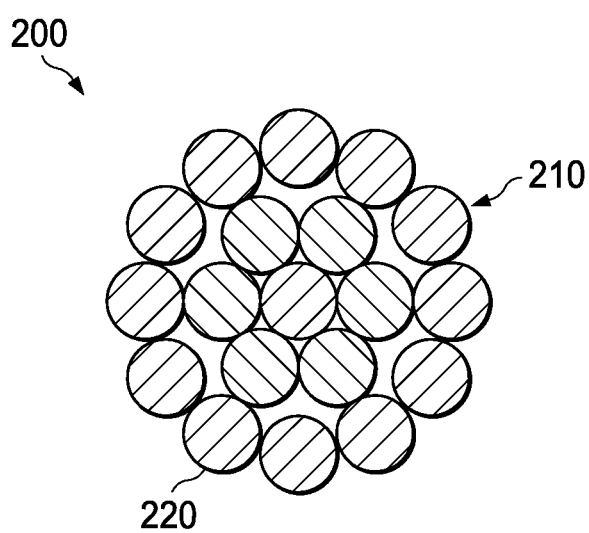
FIG. 2 depicts a cross-sectional view of a conductor in accordance with certain embodiments.

As depicted in FIG. 2, certain bare overhead conductors 200 can generally include round conductive wires 210 and a heat-radiative coating layer 220. The conductive wires 210 can be made from copper, a copper alloy, aluminum, an aluminum alloy, including aluminum types 1350, 6000 series alloy aluminum, an aluminum-zirconium alloy, or any other conductive metal.

Figure 3:
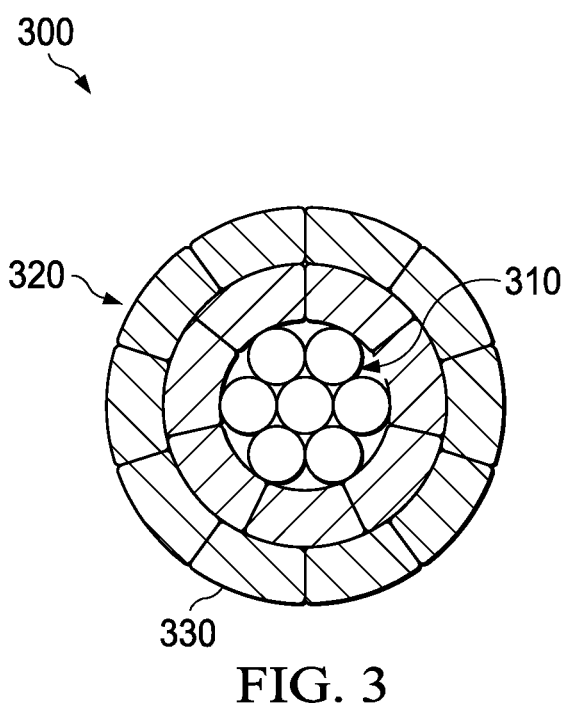
FIG. 3 depicts a cross-sectional view of a conductor in accordance with certain embodiments.

As seen in FIG. 3, certain bare overhead conductors 300 can generally include a core 310 of one or more wires, a plurality of trapezoidal-shaped conductive wires 320 around a core 310, and the coating layer 330. The coating layer 330 can be coated on conductive wires 320 or can be coated on only the exposed exterior portion of cable 300. The core 310 can be steel, invar steel, carbon fiber composite, or any other material providing strength to the conductor. The conductive wires 320 can be copper, a copper alloy, aluminum, an aluminum alloy, including aluminum types 1350, 6000 series alloy aluminum, an aluminum-zirconium alloy, or any other conductive metal.

Figure 4:
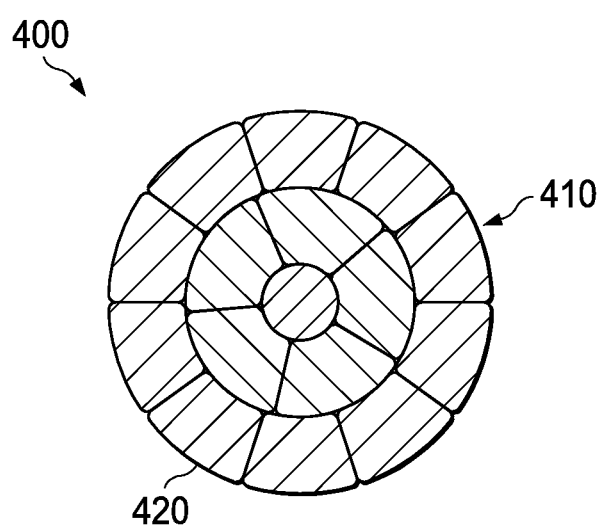
FIG. 4 depicts a cross-sectional view of a conductor in accordance with certain embodiments.

As depicted in FIG. 4, certain bare overhead conductors 400 can generally include trapezoidal-shaped conductive wires 410 and a coating layer 420. The conductive wires 410 can be formed from copper, a copper alloy, aluminum, an aluminum alloy, including aluminum types 1350, 6000 series alloy aluminum, an aluminum-zirconium alloy, or any other conductive metal.

In certain embodiments, the surface of an overhead conductor can be prepared prior to the application of the coating composition. The preparation process can include chemical treatment, pressurized air cleaning, hot water or steam cleaning, brush cleaning, heat treatment, sand blasting, ultrasound, deglaring, solvent wipe, plasma treatment, corona treatment, and the like. In one embodied process, the surface of the overhead conductor can also, or alternatively, be deglared by sand blasting.

A coating composition can be applied by a spray gun in certain embodiments. The spray gun can apply the coating composition using a pressure of about 10 psi to about 45 psi. In such embodiments, the spray gun nozzle can be placed perpendicular (e.g., at about 90°) to the longitudinal direction of the overhead conductor to get a uniform coating on conductor product. In certain embodiments, two or more spray guns can be used to get more efficient, or uniform, coatings. The coating thickness and density can be controlled by the admixture viscosity, gun pressure, and conductor line speed. During the coating application, the overhead conductor temperature can be maintained between 10° C to 90° C depending on the material of the conductor.

Alternatively, a coating composition can be applied to an overhead conductor by one or more of dipping, a brush, or a roller. In embodiments dipping a conductor, a cleaned and dried conductor can be dipped into the coating composition to allow the coating composition to completely coat the conductor. The conductor can then be removed from the coating composition and allowed to dry.

After application of the composition onto the conductor, the coating on the overhead conductor can be dried and cured through evaporation either at room temperature or at elevated temperatures. In certain embodiments, the coating can be dried with a heating method. In such embodiments, an oven can be heated up to about 250° C, or in certain embodiments, from about 80° C to about 150° C. In other certain embodiments, heat can alternatively be applied through hot air heating or induction heating. In certain embodiments, the step of drying and curing the coating composition can be followed by additional post-curing processes.

The process of drying and curing can take place in a continuous or batch manner. When the drying and curing process is run continuously, the conductor can exit the coating step, and continuously enter an air knife and curing process. Alternatively, in a batch manner process, the curing step can be performed on individual sections of the conductor using, for example, a flaming process. As illustrative examples, in a batch process, after initial drying and partial curing, the coated cable can be wound on to a bobbin, which can subsequently be transferred to a curing process such as an oven. In continuous production, a conductor can instead be wound on a bobbin after continually transferring through a heated oven heated to about 50° C to about 250° C, in certain embodiments at about 80° C to about 150° C, for about 0.1 hour to about 24 hours in certain embodiments, and from about 1 hour to about 15 hours in certain embodiments.

As can be appreciated, the coating composition can also be used with overhead conductors which are already installed and are currently in use. Existing conductors can, in certain examples, be coated using a robotic system for automated or semi-automated coating. The automated system functions in three steps including the steps of (1) cleaning the conductor surface; (2) applying a coating on the conductor surface; and (3) drying the coating. As can be further appreciated a coating composition can also be used with overhead transmission line accessories including, for example, transformers, insulators, dead-ends/termination products, splices/joints, products, suspension and support products, motion control/vibration products "dampers", guying products, wildlife protection and deterrent products, conductor and compression fitting repair parts, substation products, clamps and other transmission and distribution accessories. Such products can be commercially obtained from a variety of manufacturers including Preformed Line Products (PLP) of Cleveland, Ohio and AFL of Duncan, S.C The coating can be applied to a conductor, or other substrate, in a variety of ways. The coating, for example, can be applied by coating the individual wires before their assembly in a bare overhead conductor in certain embodiments. In such embodiments, all of the wires of the conductor can be coated, or only selective wires can be coated. As can be appreciated, it can be advantageous in terms of time, material, or the like to coat only the outer-most wires of a conductor. Alternatively, the coating can be applied only to the outer surface of a bare overhead conductor. In one embodiment, the complete outer surface of a bare conductor can be coated, or in other embodiments only a portion of the bare conductor can be coated.

Figure 5:
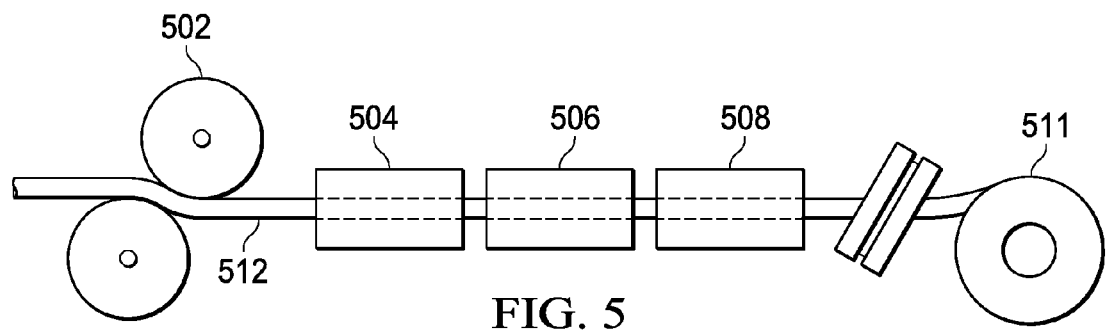
FIG. 5 depicts a schematic view of a continuous process for coating a substrate according to certain embodiments.

FIG. 5 illustrates a continuous coating process. In the continuous process illustrated in FIG. 5, a conductor 512 can be passed from an intake winder 502 through a surface preparation process. The surface preparation process occurs via a pretreatment unit 504. After the surface preparation process, a coating is applied at coating unit 506. After the coating is applied, the conductor can be dried via a drying/curing unit 508. Once dried, the cable can be wound on a roller 511.

In the pretreatment unit 504, a surface of the conductor 512, can be prepared by media blasting. Such media can include sand, glass beads, ilmenite, steel shot, and other suitable media. The media blasting can be followed by air-wiping to blow the particulate materials off the conductor 512. An air-wipe consists of jets of air blown on to the conductor 512 at an angle and in a direction opposing the direction of travel of the conductor 512. The air jets create a 360° ring of air that attaches to the circumference of the conductor 512 and wipes the surface with the high velocity of air. In this case, as the conductor exits the pretreatment unit 504, any particles on the conductor 512 are wiped and blown back into the pretreatment unit 504. The air jet typically operates at about 60 PSI to about 100 PSI, in certain embodiments from about 70 PSI to about 90 PSI, and in certain embodiments about 80 PSI. The air jet can have a velocity (coming out of the nozzles) of from about 125 mph to about 500 mph, in certain embodiments from about 150 mph to about 400 mph, and in certain embodiments from about 250 mph to about 350 mph. After the air-wipe, a number of particles, that are greater than 10 microns in size, on the surface of the conductor can be about 1,000 per square feet or less of the conductor surface, in certain embodiments about 100 per square feet or less of the conductor surface. After the air wipe, a conductor can be heated, e.g. by a heating oven, UV, IR, E-beam, induction heating, pressurized steam heating, and the like. The heating can be accomplished by single or multiple units. High heating temperature in pretreatment can allow for a lower heating temperature later in the drying/curing unit. However, the heating should not be too severe that it affects the quality of the coating (e.g. adherence, evenness, blistering etc.). In certain embodiments, the conductor should not be preheated above about 120° C, and in certain embodiments no more than about 60° C.

Figure 6:
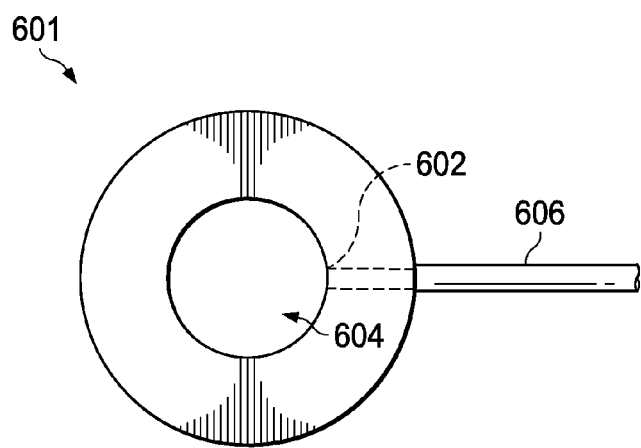
FIG. 6 illustrates a cross-sectional view of a flooded die according to certain embodiments.
Figure 7:
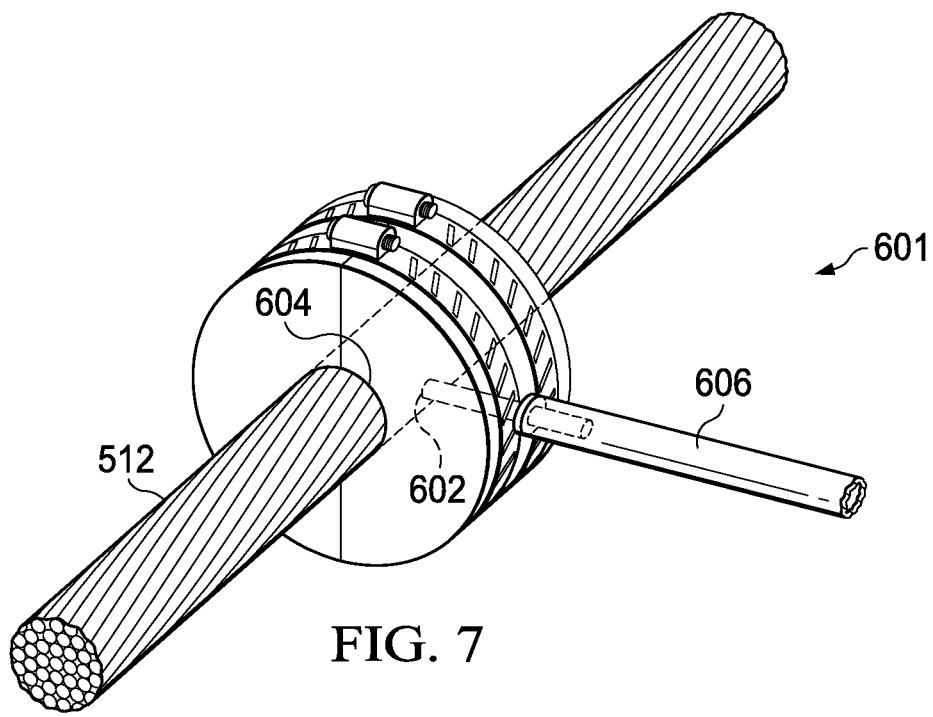
FIG. 7 depicts a plan view of a flooded die in accordance with certain embodiments.
Figure 8:
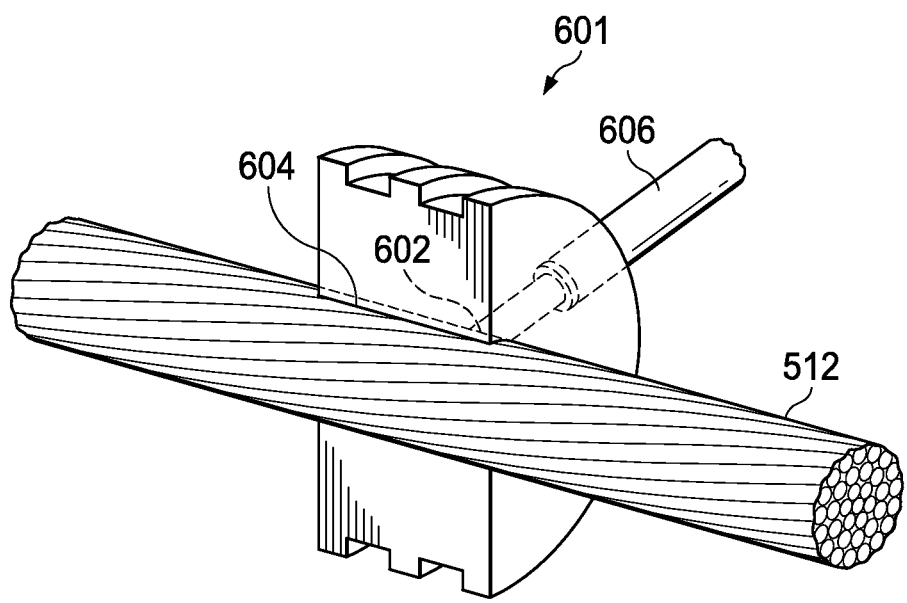
FIG. 8 illustrates a cut-away view of a flooded die according to certain embodiments.

Once the surface of the conductor 512 is prepared, it can be coated. The coating process can take place in the coating unit, where the cable passes through a flooded die that deposits a liquid suspension of the heat-radiative coating composition onto the prepared surface. FIGS. 6-8 depict an annular shaped flooded die 601. The coating suspension can be fed to the die 601 via a tube 606. As the conductor 512 passes though the center opening 604 of the flooded die 601, the coating suspension coats the conductor 512 via one or more opening ports 602 in the inner surface of the die 601. In certain embodiments, the flooded die 601 can include two or more, four or more, or six or more, opening ports 602 evenly spaced around the circumference of the inner surface. Once the conductor 512 exits the flooded die, it then passes through a second air wipe to remove excess coating suspension and to spread the coating evenly around the conductor 512. In the case of a stranded conductor, the air wipe can allow the coating to penetrate the grooves between the strands on the surface of the conductor. This air wipe can operate at the same condition as that for the air wipe in the pretreatment unit 504.

Once the conductor 512 is coated, it can pass through the drying/curing unit 508. The drying or curing can occur by using hot air with a temperature of up to 250° C and/or a line speed from about 9 feet/min to about 500 feet/min, and in certain embodiments from about 20 feet/min to about 400 feet/min, depending on the metal alloy used in the conductor. The drying process may be a gradual drying process or a rapid drying process. The drying or curing also can be accomplished by other techniques, including, for example, a heating oven, UV, IR, E-beam, induction heating, chemical or liquid spray curing process. The drying can be accomplished by single or multiple units. It also can be vertical or horizontal or at a specific angle. Once dried or cured, the coated conductor 512 can be wound on a roller 511 for storage.

The continuous process, if operated for an individual strand (instead of the whole conductor), can operate at a line speed of about 2500 ft/min or less, in certain embodiments from about 9 ft/min to about 2000 ft/min, in certain embodiments from about 10 ft/min to about 500 ft/min, and in certain embodiments from about 30 ft/min to about 300 ft/min.

A coating can also, or alternatively, be used in composite core conductor designs. Composite core conductors are useful due to their lower sag at higher operating temperatures and higher strength to weight ratio. Reduced conductor operating temperatures due to a coating can further lower sag of the conductors and lower degradation of polymer resin in the composite. Examples for composite cores can be found, e.g., in U.S. Pat. Nos. 7,015,395, 7,438,971, and 7,752,754, which are incorporated herein by reference.

Once coated onto a conductor and dried/cured, the layer formed by the coating can have a thickness of about 100 microns or less in certain embodiments, and in certain embodiments about 10 microns to about 30 microns. The coatings produced can be non-white and can have L value of about 20 or more. In other certain embodiments, the coatings can be transparent. The coatings can be electrically non-conductive, semi-conductive, or conductive.

A conductor coated with a coating can exhibit improved heat dissipation. Emissivity is the relative power of a surface to emit heat by radiation, and the ratio of the radiant energy emitted by a surface to the radiant energy emitted by a blackbody at the same temperature. Emittance is the energy radiated by the surface of a body per unit area. Emissivity can be measured, for example, by the method disclosed in U.S. Patent Application Publication No. 2010/0076719, which is incorporated herein by reference. The coated conductor can have an emissivity coefficient of about 0.3 or more in certain embodiments, in certain embodiments, about 0.5 or more; and in certain embodiments about 0.75 or more.

Testing Procedure

Flexibility and thermal stability: The flexibility of the coating was tested before and after heat aging using the Mandrel Bend test. Heat aging of the coated samples was done to test the thermal stability of the coating. Samples were placed in an air circulation oven at a temperature of 300° C. for a period of 14 days and then samples were placed at room temperature for a period of 24 hrs. These coated samples were bent on different cylindrical mandrels sizes (from larger diameter to small diameter); and the coatings were observed for any visible cracks at each of the mandrel sizes. The presence of visible cracks indicates failure of the sample.

Figure 9:
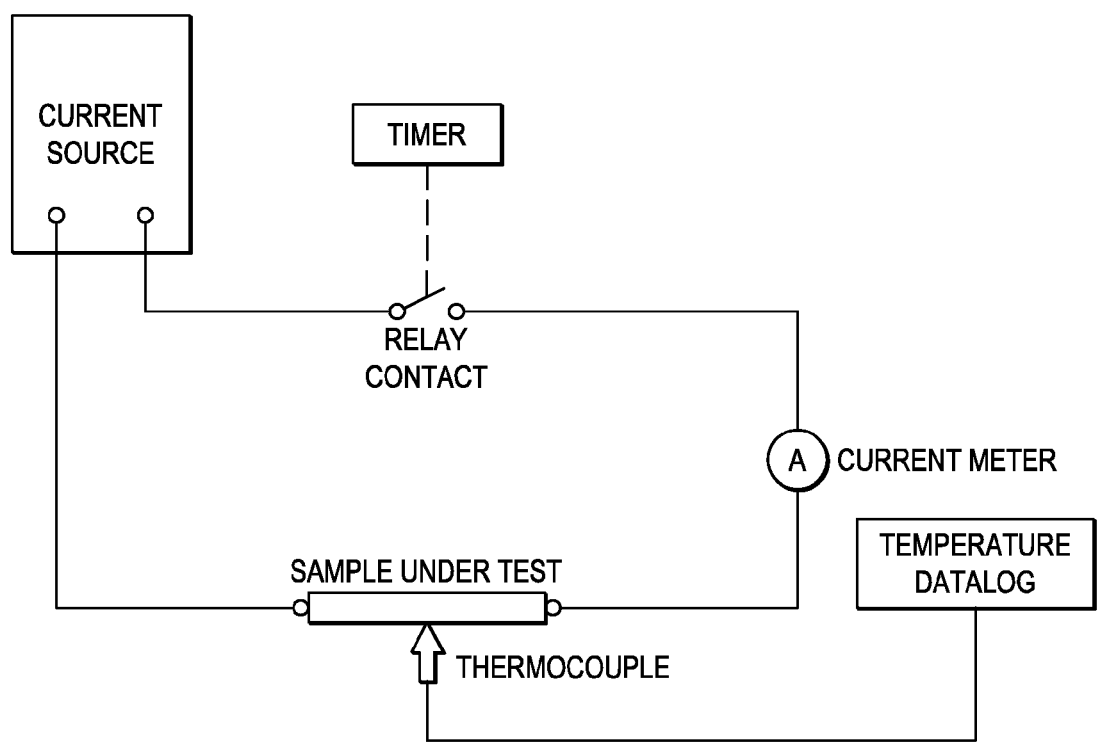
FIG. 9 depicts a schematic view of a test arrangement to measure the temperature of metal substrate for a given applied current.

Temperature reduction: A current is applied through the metal substrate with a 1 mil coating thickness and an uncoated metal substrate to measure the performance improvement of the coating. The test apparatus is illustrated in FIG. 9 and consists of a 60 Hz AC current source, a true RMS clamp-on current meter, a temperature datalog device and a timer. Testing was conducted within a 68" wide×33" deep windowed safety enclosure to control air movement around the sample. An exhaust hood was located 64" above the test apparatus for ventilation.

The sample to be tested was connected in series with an AC current source through a relay contact controlled by a timer. The timer was used to activate the current source and control the time duration of the test. The 60 Hz AC current flowing through the sample was monitored by a true RMS clamp-on current meter. A thermocouple was used to measure the surface temperature of the sample. Using a spring clamp, the tip of the thermocouple was kept firmly in contacted with the center surface of the sample. In case of measurement on coated sample, the coating was removed at the area where thermocouple made the contact with the sample to get accurate measurement of the temperature of the substrate. The thermocouple temperature was monitored by a datalog recording device to provide a continuous record of temperature change.

Both coated cable samples were tested for temperature rise on test set-up of FIG. 9 under identical experimental conditions. The current was set at a desired level and was monitored during the test to ensure a constant current through the samples. The timer was set at a desired value and the temperature datalog recording device was set to record temperature at a recording interval of one reading per second.

The metal component for the uncoated and coated samples was from the same source material and lot of Aluminum 1350. The finished dimensions of the uncoated sample were 12.0"(L)×0.50"(W)×0.027"(T). The finished dimensions of the coated samples were 12.0"(L)×0.50"(W)× 0.029"(T).The increase in thickness and width was due to the thickness of the applied coating.

The temperature test data was then accessed from the datalog device and analyzed using a computer. The temperature (measured in ° C.) of the coated samples as compared to uncoated sample are reported as % reduction relative to uncoated sample.

EXAMPLES

Below are details of the primary components used in the examples of Table 1.

1. Polyurethane: Aeroglaze® A276 from LORD Corporation, solvent-based moisture-curable polyurethane coating having a volatile organic content ("VOC") of 520 g/L as per ASTM D 3960-87.
2. FEVE 1: Lumiflon® FD 1000 from AGC Chemicals, water based FEVE dispersion having 40 wt. % solid content, a $M_n$ of about 10,000, and a hydroxyl value of about 85 mg KOH/g.
3. FEVE 2: Lumiflon® FE 4400 from AGC Chemicals, water based FEVE emulsion having 50 wt. % solid content, a $M_n$ of about 90,000, and a hydroxyl value of about 49 mg KOH/g.
4. Cross-linking agent: Bayhydur® 302 from Bayer chemicals, hexamethylene diisocyanate.

As depicted in Table 1, three coating compositions were evaluated including one Comparative Example using a commercial polyurethane coating composition and two Inventive Examples. Each inventive coating composition was produced by making a compositional kit including two composition parts. The first composition part included a FEVE copolymer and a filler and the second composition part included a cross-linking agent in a water dispersion.

The Comparative Example is comparative because it does not have a FEVE copolymer. Inventive Examples 1 and 2 demonstrate that a cross-linked FEVE copolymer coating composition, substantially free of an organic solvent, can provide a temperature reduction of at least 15%. As noted below, Inventive Example 2 also passed the Mandrel Bend Test after age heating for both 7 days and 14 days at 300° C.

TABLE 1

Details of three different coating compositions.

| Components | Comparative Example | Inventive Example 1 | Inventive Example 2 | Inventive Example 3 | Inventive Example 4 |
| --- | --- | --- | --- | --- | --- |
| Part 1 | | | | | |
| Polyurethane | 100 | — | — | — | — |
| FEVE 1 | — | — | 75 | 87.5 | 92.5 |
| FEVE 2 | — | 75 | — | — | — |
| Zinc Oxide | — | 15 | 15 | — | — |
| Treated Fumed Silica | — | — | — | 2.5 | 2.5 |
| Part 2 (Cross-linking agent) | | | | | |
| Hexamethylene diisocyanate (Bayhdur ® 302) | — | 10 | 10 | — | 10 |
| Methoxy silane | — | — | — | — | 5 |
| Total | 100 | 100 | 100 | 100 | 100 |
| Temperature reduction (%) 95 amps for 15 minutes | 19 | 17 | 15 | 17 | 17 |
| Mandrel Bend Test (passing size & Pass/Fail) | | | | | |
| Initial | 0.5" (Pass) | 0.5" (Pass) | 0.5" (Pass) | 0.5" (Pass) | 0.5" (Pass) |
| After heat aging at 300° C. & for 1 day | 6" (Fails) | 0.5" (Pass) | 0.5" (Pass) | 0.5" (Pass) | 0.5" (Pass) |
| After heat aging at 300° C. & for 7 days | 6" (Fails) | 6" (Fails) | 0.5" (Pass) | 0.5" (Pass) | 0.5" (Pass) |
| After heat aging at 300° C. & for 14 days | Brittle (Fails) | Brittle (Fails) | 0.5" (Pass) | 0.5" (Pass) | 0.5" (Pass) |
| Contact Angle (deg.) | — | — | 112 | 134 | 133 |

As used herein, all percentages (%) are percent by weight of the total composition, also expressed as weight/weight %, % (w/w), w/w, w/w % or simply %, unless otherwise indicated. Also, as used herein, the terms "wet" refers to relative percentages of the coating composition in a dispersion medium (e.g. water); and "dry" refers to the relative percentages of the dry coating composition prior to the addition of the dispersion medium. In other words, the dry percentages are those present without taking the dispersion medium into account. Wet admixture refers to the coating composition with the dispersion medium added. "Wet weight percentage", or the like, is the weight in a wet mixture; and "dry weight percentage", or the like, is the weight percentage in a dry composition without the dispersion medium. Unless otherwise indicated, percentages (%) used herein are dry weight percentages based on the weight of the total composition.

The dimensions and values disclosed herein are not to be understood as being strictly limited to the exact numerical values recited. Instead, unless otherwise specified, each such dimension is intended to mean both the recited value and a functionally equivalent range surrounding that value.

It should be understood that every maximum numerical limitation given throughout this specification includes every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

Every document cited herein, including any cross-referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests, or discloses any such invention. Further, to the extent that any meaning or definition of a term in this document conflicts with any meaning or definition of the same term in a document incorporated by reference, the meaning or definition assigned to that term in the document shall govern.

The foregoing description of embodiments and examples has been presented for purposes of description. It is not intended to be exhaustive or limiting to the forms described. Numerous modifications are possible in light of the above teachings. Some of those modifications have been discussed and others will be understood by those skilled in the art. The embodiments were chosen and described for illustration of various embodiments. The scope is, of course, not limited to the examples or embodiments set forth herein, but can be employed in any number of applications and equivalent articles by those of ordinary skill in the art. Rather it is hereby intended the scope be defined by the claims appended hereto.

What is claimed is:

1. A coating composition comprising:
   a water-dispersible fluoroethylene vinyl ether copolymer;
   a cross-linking agent; and
   wherein the coating composition is configured to reduce the operating temperature of an overhead conductor by at least about 5° C. compared to a similar uncoated overhead conductor when the operating temperatures of each overhead conductor are measured at about 100° C. or higher, and wherein the coating composition is substantially free of solvent.

2. The coating composition of claim 1 further comprises water, the water comprising about 30% or more, by weight, of the coating composition.

3. The coating composition of claim 1, wherein the water-dispersible fluoroethylene vinyl ether copolymer has a number average molecular weight of about 90,000 or less.

4. The coating composition of claim 1 comprising about 30% or more, by dry weight, of the fluoroethylene vinyl ether copolymer.

5. The coating composition of claim 1 further comprising a filler, the filler comprising one or more of silica, zinc oxide, aluminum oxide, and carbon nanotubes.

6. The coating composition of claim 5, wherein the filler comprises the carbon nanotubes and wherein the coating composition is electrically conductive or semi-conductive.

7. The coating composition of claim 6 exhibiting a volume resistivity of about $10^9$ ohm-m or less.

8. The coating composition of claim 1 comprising from about 1% to about 20%, by dry weight, of the cross-linking agent.

9. The coating composition of claim 1, wherein the cross-linking agent comprises one or more of isocyanate, methoxy silane, epoxy silane, and reactive silicones.

10. The coating composition of claim 1, wherein the water-dispersible fluoroethylene vinyl ether copolymer has at least about 85 mg of KOH per gram of the water-dispersible fluoroethylene vinyl ether copolymer.

11. The coating composition of claim 1 exhibits a water contact angle of 90 degrees or more when cured.

12. A method of producing a coating for an overhead conductor, the method comprising:
    providing a compositional kit, the composition kit formed by at least a first composition and a second composition, the first composition comprising a water-dispersible fluoroethylene vinyl ether copolymer and the second composition comprising a cross-linking agent;
    mixing the first composition with the second composition to form a coating composition; and
    applying the coating composition to at least a portion of an overhead conductor to form a coated overhead conductor; wherein the coating reduces the operating temperature of the coated overhead conductor by about 5° C. or more compared to a similar uncoated overhead conductor when the operating temperatures of each overhead conductor are measured at about 100° C. or higher, and wherein the coating composition is substantially free of solvent.

13. The method of claim 12 is continuous.

14. The method of claim 12, further comprising the step of drying the coating composition with temperatures between about 50° C. and about 250° C.

15. The method of claim 14, wherein the step of drying the coating composition comprises a duration of about 2 minutes or less.

16. An improved overhead conductor comprising:
    a plurality of conductive wires; and
    a coating on the surface of at least some of the plurality of conductive wires, the coating formed from a coating composition, the coating composition comprising:
        a water-dispersible fluoroethylene vinyl ether copolymer;
        a cross-linking agent; and
    wherein the improved overhead conductor has a reduced operating temperature of about 5° C. or more compared to a similar uncoated overhead conductor when the operating temperatures of each overhead conductor are measured at about 100° C. or higher, and wherein the coating composition is substantially free of solvent.

17. The improved overhead conductor of claim 16, wherein the coating has a thickness of about 5 microns to about 25 microns.

18. The improved overhead conductor of claim 16, wherein the coating is transparent.

19. The improved overhead conductor of claim 16 passes the 0.5" mandrel bend test after heat aging at 300° C. for 7 days.

20. The improved overhead conductor of claim 16 includes a single coating layer.

\* \* \* \* \*